(12) United States Patent
Seiler et al.

(10) Patent No.: US 8,167,983 B2
(45) Date of Patent: May 1, 2012

(54) GAS SEPARATION MEMBRANES

(75) Inventors: Matthias Seiler, Griesheim (DE);
Stefan Bernhardt, Offenbach (DE);
Rolf Schneider,
Gruendau-Rothenbergen (DE); Roland Wursche, Duelmen (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 253 days.

(21) Appl. No.: 12/517,372

(22) PCT Filed: Dec. 17, 2007

(86) PCT No.: PCT/EP2007/064051
§ 371 (c)(1),
(2), (4) Date: Jun. 3, 2009

(87) PCT Pub. No.: WO2008/077837
PCT Pub. Date: Jul. 3, 2008

(65) Prior Publication Data
US 2010/0071557 A1 Mar. 25, 2010

(30) Foreign Application Priority Data

Dec. 23, 2006 (DE) .................. 10 2006 061 457
Dec. 4, 2007 (DE) .................. 10 2007 058 320

(51) Int. Cl.
*B01D 53/22* (2006.01)
*B01D 39/16* (2006.01)

(52) U.S. Cl. ........... 96/11; 96/4; 96/10; 96/12; 96/13; 96/14; 95/45; 55/486; 55/487; 55/522; 55/528; 210/500.23; 210/500.27; 210/500.28; 525/55; 525/420; 525/435; 525/462; 525/471; 525/474; 525/540

(58) Field of Classification Search .......... 95/45, 47, 95/54; 96/4, 8, 10, 11, 12, 13, 14; 55/486, 55/487, 522, 528; 210/500.21, 500.23, 500.27, 210/500.28; 525/55, 403, 420, 435, 436, 525/453, 462, 474, 471, 535, 540
See application file for complete search history.

(56) References Cited

U.S. PATENT DOCUMENTS

| | | | |
|---|---|---|---|
| 5,833,854 A * | 11/1998 | Zwijnenburg et al. | ... 210/500.27 |
| 6,355,358 B1 | 3/2002 | Boeer et al. | |
| 6,391,982 B1 | 5/2002 | Haeger et al. | |
| 6,538,073 B1 | 3/2003 | Oenbrink et al. | |
| 6,677,015 B2 | 1/2004 | Himmelmann et al. | |
| 6,924,028 B2 * | 8/2005 | Chung et al. | ............. 55/487 |
| 7,169,885 B2 * | 1/2007 | Chung et al. | .............. 525/436 |
| 7,771,521 B2 * | 8/2010 | Yamada et al. | ................ 96/12 |
| 2002/0002242 A1 * | 1/2002 | McNamara et al. | ............ 525/107 |
| 2002/0151655 A1 | 10/2002 | McNamara et al. | |
| 2008/0203012 A1 * | 8/2008 | Yeager et al. | ........... 210/500.36 |
| 2008/0207871 A1 | 8/2008 | Seiler et al. | |
| 2009/0217819 A1 * | 9/2009 | Wessling et al. | ................ 96/14 |
| 2010/0078386 A1 * | 4/2010 | Kulkarni et al. | ........ 210/500.23 |
| 2010/0181257 A1 * | 7/2010 | Frechet et al. | ................ 210/683 |

FOREIGN PATENT DOCUMENTS

| | | |
|---|---|---|
| EP | 0 780 152 | 6/1997 |
| WO | 2007 105952 | 9/2007 |

OTHER PUBLICATIONS

U.S. Appl. No. 12/296,168, filed Oct. 6, 2008, Seiler, et al.
"Mixture" http://en.wikipedia.org/wiki/Mixture accessed Aug. 8, 2011.

* cited by examiner

*Primary Examiner* — Jason M Greene
(74) *Attorney, Agent, or Firm* — Oblon, Spivak, McClelland, Maier & Neustadt, L.L.P.

(57) ABSTRACT

The present invention relates to compositions for producing membranes, the compositions comprising at least 0.1% by weight of highly branched polymer, at least 0.5% by weight of linear polymer and at least 30% by weight of solvent. The present invention additionally describes membranes obtainable from the compositions, and methods of producing these membranes.

25 Claims, No Drawings

GAS SEPARATION MEMBRANES

The present invention relates to compositions for producing membranes. The present invention additionally relates to membranes which can be produced using these compositions.

Gas separation membranes have been known for some time, being described, by way of example, in a review article by C. E. Powell and G. G. Qiao, in "Polymeric $CO_2/N_2$ gas separation membranes for the capture of carbon dioxide from power plant flue gases", Journal of Membrane Science, 279 (2006), 1-49.

They include more particularly membranes which as their separation layer or filter layer have particular high-performance polymers, examples being polyimides, polysulphones, etc. Membranes of this kind are set out at greater length in WO 2004/050223.

Likewise known, additionally, are membranes which have been crosslinked using highly branched polymers. These membranes are set out in publications including EP-A-1 457 253; L. Shao et al., Journal of Membrane Science, 238 (2004), 153; and T.-S. Chung et al., Langmuir 20 (2004) 2966. For crosslinking, the membranes used are placed in a swelling medium that comprises an appropriate crosslinking agent. The crosslinking described in these documents achieves advantages in respect of selectivity. There is, however, a sharp reduction in the gas permeability.

Additionally WO 2006/046795 describes membranes based on polymer blends which comprise amorphous linear and semi-crystalline polymers. WO 99/40996, furthermore, describes membranes obtained by impregnating pores with polymers. Also set out therein are membranes which comprise hyperbranched polymers. That document, however, does not set out any mixtures of hyperbranched polymers and linear polymers. In addition, the hyperbranched polymers display a poorer performance than linear polymers.

T. Suzuki et al., Polymer 45 (2004) 7167-7171, describes, furthermore, membranes produced from hyperbranched polyimides. A comparison, however, shows that the selectivity of membranes formed from linear polymers is higher than that of membranes formed from hyperbranched polymers. This is true more particularly in respect of the nitrogen/oxygen permeability. A mixture of linear and hyperbranched polymers is not set out in that publication.

The performance spectrum of the membranes described above is already good. There nevertheless exists a sustained requirement for enhancing the performance of these membranes.

In the light of the prior art, then, it is an object of the present invention to provide membranes, and compositions for producing these membranes, that display a particularly good profile of properties.

One particular problem was that, more particularly, of providing separation membranes, and more particularly gas separation membranes, which exhibit a combination of high selectivity and high permeability. A further object may be seen as that of specifying membranes which have a particularly high mechanical stability and a long life. Additionally it was intended that the membranes should be useful for a multiplicity of different gas separations. It was further intended that the membrane should be easy and inexpensive to produce.

These objects and further objects which, though not stated explicitly, are nevertheless readily inferable or derivable from the circumstances discussed here in the introduction, are achieved by means of a composition for producing membranes which contains 0.1% to 69.5% by weight of highly branched polymer, 0.5% to 69.9% by weight of linear polymer and 30% to 99.4% by weight of solvent, the percentages being based on the sum of these three components, and also by membranes which can be obtained using this composition.

By virtue of the fact that a composition for producing membranes comprises at least 0.1% by weight of highly branched polymer, at least 0.5% by weight of linear polymer and at least 30% by weight of solvent it is possible, surprisingly, to provide membranes which have a particularly good profile of properties.

At the same time it is possible, through the membranes and compositions of the invention, to achieve a series of further advantages. Thus the membranes of the invention exhibit high selectivity in combination with high permeability. Furthermore, the membranes of the present invention have a particularly high mechanical stability and a long life. Additionally the membranes can be used for a multiplicity of different gas separations. The membranes, furthermore, are simple and inexpensive to produce.

A composition for producing the present membranes comprises at least 0.1%, preferably at least 0.5% and very preferably at least 2% by weight of highly branched polymer.

Highly branched, globular polymers are referred to in the technical literature by terms which include that of "dendritic polymers". These dendritic polymers, synthesized from polyfunctional monomers, can be divided into two different categories: the "dendrimers" and also the "hyperbranched polymers" in the narrower sense. Dendrimers possess a highly regular, radially symmetric generational structure. They represent monodisperse globular polymers which, in comparison to hyperbranched polymers, are prepared in multi-step syntheses with a high degree of synthetic complexity. The structure in this case is characterized by three different areas: the polyfunctional core, which represents the centre of symmetry; different, well-defined radially symmetric layers of one repeating unit (generation); and the terminal groups. In contrast to the dendrimers, the hyperbranched polymers in the narrower sense are polydisperse and are irregular in terms of their branching and structure. Besides the dendritic units and terminal units, hyperbranched polymers differ from dendrimers in containing linear units as well. An example of a dendrimer and of a hyperbranched polymer, constructed from repeating units which in each case contain three bonding possibilities, is shown respectively in the following structures:

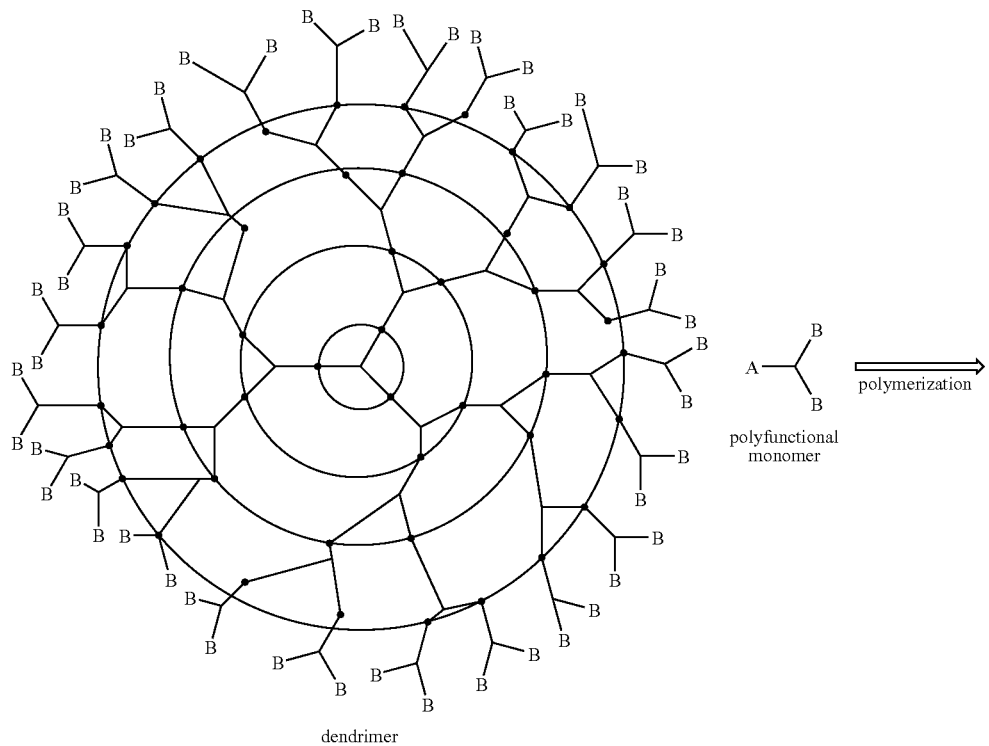

dendrimer

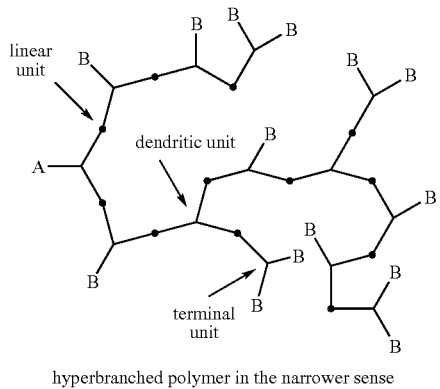

hyperbranched polymer in the narrower sense

With respect to the various possibilities relating to the synthesis of dendrimers and hyperbranched polymers in the narrower sense, reference may be made to
a) Fréchet J. M. J., Tomalia D. A., *Dendrimers and Other Dendritic Polymers*, John Wiley & Sons Ltd., West Sussex, UK 2001 and also
b) Jikei M., Kakimoto M., Hyperbranched polymers: a promising new class of materials, *Prog. Polym. Sci.*, 26 (2001) 1233-85 and/or
c) Gao C., Yan D., *Hyperbranched Polymers: from synthesis to applications, Prog. Polym. Sci.*, 29 (2004) 183-275, which are hereby introduced as references and are considered part of the disclosure content of the present invention.

For the purposes of the present invention the term "highly branched polymer" refers to highly branched polymers which encompass not only the above-described dendrimers but also the above-illustrated hyperbranched polymers in the narrower sense. With preference in accordance with the invention it is possible to use the hyperbranched polymers in the narrower sense which are polydisperse and are irregular in their branching and structure.

In this context it is preferred for the hyperbranched polymers to possess at least three repeating units per molecule, preferably at least ten repeating units per molecule, with further preference at least 100 repeating units per molecule, with preference, moreover, at least 200 repeating units, and with preference, in addition, at least 400 repeating units, each having at least three, preferably at least four, bonding possibilities, with at least three of these repeating units, more preferably at least ten and with further preference at least 20 of these repeating units being linked in each case via at least three, preferably via at least four, bonding possibilities to at least three, preferably at least four, further repeating units.

The hyperbranched polymers variously have not more than 10 000, preferably not more than 5000 and with particular preference not more than 2500 repeating units.

In one preferred embodiment the highly branched polymer has at least three repeating units each of which has at least three possible bonding possibilities, with at least three of these repeating units having at least two possible bonding possibilities.

In this context the term "repeating unit" refers preferably to a continually recurring structure within the hyperbranched molecule. The term "bonding possibility" preferably refers to that functional structure within a repeating unit which allows linking to another repeating unit. Based on the above-depicted examples of a dendrimer and of a hyperbranched polymer, respectively, the repeating unit is a structure having in each case three bonding possibilities (X, Y, Z):

The linking of the individual bonding units to one another may take place by condensation polymerization, by free-radical polymerization, by anionic polymerization, by cationic polymerization, by group transfer polymerization, by coordinative polymerization or by ring opening polymerization.

Additionally the highly branched polymers for the purposes of this invention include comb polymers and star polymers. The terms "comb polymers" and "star polymers" are known in the art and described in Römpp Chemie Lexikon, $2^{nd}$ Edition on CD-ROM, for example.

Comb polymers have a main chain to which side chains are connected. Preferred comb polymers have at least 5, preferably at least 10 and very preferably at least 20 side chains. The weight ratio of the main chain to the side chains is preferably in the range from 1:2 to 1:200, more preferably 1:4 to 1:100. This weight ratio is a result of the components used for the preparation.

Star polymers have a centre which may be, for example, a hyperbranched polymer. Going out from the centre are polymer chains, also referred to as arms. Preferred star polymers have at least 5, more preferably at least 8 and very preferably at least 15 arms. The weight ratio of centre to the arms is preferably in the range from 1:2 to 1:200, more preferably 1:4 to 1:100. This weight ratio is a result of the components used for the preparation.

The highly branched polymer may preferably have a molecular weight of at least 1500 g/mol, more preferably at least 3000 g/mol. The molecular weight is preferably not more than 100 000 g/mol, with particular preference not more than 50 000 g/mol. This parameter is based on the weight-average molecular weight ($M_w$) measured in accordance with ISO 16014 by means of gel permeation chromatography, the measurement taking place in DMF and using, for reference, polyethylene glycols (cf., inter alia, Burgath et al. in Macromol. Chem. Phys., 201 (2000) 782-91). In this context a calibration plot is used which has been obtained using polystyrene standards.

The polydispersity $M_w/M_n$ of preferred highly branched polymers is preferably in the range from 1.01 to 10.0, more preferably in the range from 1.10 to 8.0 and very preferably in the range from 1.2 to 5.0, the number-average molecular weight ($M_n$) being obtained likewise by means of GPC in accordance with ISO 16014.

The viscosity of the highly branched polymer is preferably in the range from 50 mPas to 1000 Pas, more preferably in the range from 70 mPas to 300 Pas, this parameter being measured by oscillation viscometry at 30 s$^{-1}$ between cone and plate. The melt viscosity is determined in accordance with ASTM D 4440. The temperature for the measurement of the melt viscosity is 220° C.; for higher-melting polymers it is 240° C. or 260° C., and for even higher-melting polymers it is 280° C., 300° C., 320° C., 340° C. or 360° C. The temperature selected should always be the lowest possible temperature at which the polymer can be adequately processed. A sufficiently high melt viscosity is desirable because the membrane of the invention is to possess a sufficient mechanical stability.

The degree of branching of the highly branched polymer is preferably in the range from 1% to 95%, preferably 2% to 75%. The degree of branching is dependent on the components used to prepare the polymer and also on the reaction conditions. The method of determining the degree of branching is set out in D. Hölter, A. Burgath, H. Frey, Acta Polym., 1997, 48, 30. The degree of branching may additionally be at least 5%, at least 10% or at least 25%.

The highly branched polymer preferably has a melting temperature of less than 350° C., preferably less than 275° C., more preferably less than 250° C. According to one particular aspect of the present invention the melting temperature of the highly branched polymer is at least 100° C., preferably at least 150° C. and very preferably at least 170° C. The glass transition temperature of the highly branched polymer is preferably less than 175° C., more preferably less than 150° C. and very preferably less than 125° C. Preferably the glass transition temperature of the highly branched polymer is at least 0° C., more preferably at least 10° C. The hyperbranched polymers may preferably have both a glass transition temperature and a melting point. The melting temperature and glass transition temperature are determined by means of differential scanning calorimetry (DSC) in accordance with ISO 11357-3.

The highly branched polymer preferably has a high hydrolysis resistance.

The preferred highly branched polymers include more particularly polyamides, polyesteramides, polyamidoamines, polyimidoamines, polypropylenamines, polyimides, polyetherimides, polysilanes, polysiloxanes, polysulphones, polyurethanes and polyureas, which with particular preference are hyperbranched polymers. Polymers of this kind are known per se and have been widely described. These polymers may contain functional groups, such as ionic groups, for example.

Preferred highly branched polymers have polar terminal groups, preferably carboxyl or amino groups. Particularly preferred highly branched polymers have terminal amino groups, of which primary and secondary amino groups are preferred.

A highly branched polymer for use in accordance with the invention preferably has polyamide units. Highly branched polymers with polyamide units are set out more particularly in EP 1 065 236.

In one particularly preferred variant of the present invention it is possible to use at least one polyamide graft copolymer which preferably has units derived from the following monomers:

a) 0.5% to 25% by weight, based on the graft copolymer, of a polyamine having at least 11 nitrogen atoms and a number-average molecular weight $M_n$ of at least 500 g/mol and b) polyamide-forming monomers.

As polyamine it is possible to make use, for example, of the following classes of substance:

polyvinylamines (Römpp Chemie Lexikon, 9$^{th}$ Edition, Volume 6, page 4921, Georg Thieme Verlag, Stuttgart, 1992);

polyamines prepared from alternating polyketones (DE-A 196 54 058);

dendrimers such as, for example, ((H$_2$N—(CH$_2$)$_3$)$_2$N—(CH$_2$)$_3$)$_2$—N(CH$_2$)$_2$—N((CH$_2$)$_2$—N((CH$_2$)$_3$—NH$_2$)$_2$)$_2$ (DE-A-196 54 179) or 3,15-bis(2-aminoethyl)-6,12-bis[2-[bis(2-aminoethyl)-amino]ethyl]-9-[2-[bis[2-bis(2-aminoethyl)amino]ethyl]-amino]ethyl]3,6,9,12,15-pentaazaheptadecane-1,17-diamine (J. M. Warakomski, Chem. Mat. 1992, 4, 1000-04);

linear polyethylenimines which can be prepared by polymerization of 4,5-dihydro-1,3-oxazoles and subsequent hydrolysis (Houben-Weyl, Methoden der Organischen Chemie, Volume E20, pages 1482-1487, Georg Thieme Verlag, Stuttgart, 1987);

branched polyethylenimines, which are obtainable by polymerization of aziridines (Houben-Weyl, Methoden der Organischen Chemie, Volume E20, pages 1482-87, Georg Thieme Verlag, Stuttgart, 1987) and which in general possess the following amino group distribution:

25% to 46% primary amino groups,
30% to 45% secondary amino groups and
16% to 40% tertiary amino groups.

The polyamine which can be used for preparing preferred highly branched polymers possesses in the preferred case a number-average molecular weight $M_n$ of not more than 20 000 g/mol, with particular preference not more than 10 000 g/mol, and with especial preference not more than 5000 g/mol.

As polyamide-forming monomers it is possible to use known mixtures of diamines and dicarboxylic acids and/or derivatives thereof that are used for preparing polyamides. In one particular aspect of the present invention it is possible, in order to prepare the polyamide graft copolymer set out above, to use lactams and/or ω-aminocarboxylic acids. Preferred lactams and/or ω-aminocarboxylic acids contain 4 to 19 and more particularly 6 to 12 carbon atoms. Particular preference is given to using δ-caprolactam, δ-amino-caproic acid, caprylolactam, ω-aminocaprylic acid, laurolactam, ω-aminododecanoic acid and/or ω-amino-undecanoic acid.

The weight ratio of polyamine to polyamide-forming monomers for preparing the polyamide graft copolymer is preferably in the range from 1:2 to 1:200, more preferably 1:4 to 1:100. This weight ratio is a result of the components used for the preparation.

According to one particular aspect the polyamide graft copolymers set out above may contain units derived from oligocarboxylic acids.

As oligocarboxylic acid it is possible to use any dicarboxylic or tricarboxylic acid having 6 to 24 C atoms, examples being adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

Preferably the oligocarboxylic acids are selected from 0.015 to about 3 mol % of dicarboxylic acid and/or 0.01 to about 1.2 mol % of tricarboxylic acid, based in each case on lactam and/or ω-aminocarboxylic acid.

Where a dicarboxylic acid is used, it is preferred to add 0.03 to 2.2 mol %, more preferably 0.05 to 1.5 mol %, very preferably 0.1 to 1 mol % and more particularly 0.15 to 0.65 mol %, based in each case on lactam and/or ω-amino-carboxylic acid; where a tricarboxylic acid is used, it is preferred to take 0.02 to 0.9 mol %, more preferably 0.025 to 0.6 mol %, very preferably 0.03 to 0.4 mol % and more particularly 0.04 to 0.25 mol %, based in each case on lactam and/or ω-aminocarboxylic acid. The accompanying use of the oligocarboxylic acid improves the hydrolysis resistance.

The amino group concentration of the polyamide graft copolymer which can be used as highly branched polymer may be preferably in the range from 100 to 2500 mmol/kg, more particularly in the range from 150 to 1500 mmol/kg, with particular preference in the range from 250 to 1300 mmol/kg and very preferably in the range from 300 to 1100 mmol/kg. Amino groups, here and below, mean not only terminal amino groups but also, where present, secondary and/or tertiary amine functions of the polyamine.

Additionally it is possible, if desired, to use aliphatic, alicyclic, aromatic, aralkylic and/or alkyl-aryl-substituted monocarboxylic acids having 3 to 50 carbon atoms, such as laurylic acid, unsaturated fatty acids, acrylic acid or benzoic acid as regulators for preparing the polyamide graft copolymers. With these regulators it is possible to reduce the concentration of amino groups without altering the molecular architecture. Additionally it is possible in this way to introduce functional groups such as double and/or triple bonds, etc.

It is preferred to use a highly branched polyamide graft copolymer which comprises 0.5% to 20% by weight of polyamine, preferably polyethylenimine,
79% to 99% by weight of polyamide-forming monomer, preferably a lactam, such as caprolactam or laurolactam, and
0% to 1.0% by weight of oligocarboxylic acid, the percentages being based on the total weight of the polymer.

The composition of the present invention has at least 0.5%, preferably at least 5% and very preferably at least 10% by weight of linear polymer. The term "linear polymer" is known in the art, referring to polymers which have a main chain whose chain length is substantially greater than the chain length of any side chains present. The weight ratio of the carbon atoms present in the main chain to the carbon atoms present in a side chain is preferably at least 10, more preferably at least 20 and very preferably at least 30.

The linear polymers preferably have a molecular weight of at least 1000 g/mol, more preferably at least 5000 g/mol and very preferably at least 10 000 g/mol. The molecular weight is preferably not more than 1 000 000 g/mol, more preferably not more than 500 000 g/mol and very preferably not more than 250 000 g/mol. This parameter is based on the weight-average molecular weight ($M_w$), which is measured by means of gel permeation chromatography in accordance with ISO 16014.

The polydispersity $M_w/M_n$ of preferred linear polymers is preferably in the range from 1.01 to 5.0, more preferably in the range from 1.10 to 4.0 and very preferably in the range from 1.2 to 3.5, the number-average molecular weight ($M_n$) likewise being obtained by means of GPC in accordance with ISO 16014.

Depending on their crystallinity, the linear polymers have a glass transition temperature and/or a melting temperature. The linear polymer preferably has a melting temperature of less than 400° C., more preferably less than 370° C. According to one particular aspect of the present invention the melting temperature of the linear polymer is at least 100° C., preferably at least 200° C. and very preferably at least 300° C. The glass transition temperature of the linear polymer is preferably less than 400° C., more preferably less than 370° C. Preferably the glass transition temperature of the linear polymer is at least 0° C., more preferably at least 200° C. and very preferably at least 300° C. Particularly preferred linear polymers have a glass transition temperature. The measurement of the melting temperature and glass transition temperature takes place by means of differential scanning calorimetry (DSC) in accordance with ISO 11357-3.

The viscosity of the linear polymer is preferably in the range from 50 mPas to 500 000 Pas, more preferably in the range from 100 mPas to 10 000 Pas, this parameter being measured by oscillation viscometry at 30 s$^{-1}$ between cone and plate. The melt viscosity is determined in accordance with ASTM D 4440. The temperature for the measurement of the melt viscosity is 220° C.; for higher-melting polymers it is 240° C. or 260° C., and for even higher-melting polymers it is 280° C., 300° C., 320° C., 340° C. or 360° C. The temperature selected should always be the lowest possible temperature at which the polymer can be adequately processed. A sufficiently high melt viscosity is desirable because the membrane of the invention is to possess a sufficient mechanical stability.

The preferred linear polymers include, among others, polyimides, polyetherimides, polysulphones, polyarylates, polyetherarylates, polycarbonates, polypyrrolones, polyacetylenes, polyethylene oxides, polyphenylene oxides, polyphenylene sulphides, polyetheretherketone, polybenzimidazoles, polyoxadiazoles, and polyanilines. These polymers can be used individually or as a mixture. Additionally it is possible to use copolymers derived from the aforementioned polymers.

Polyamides whose use is particularly preferred are set out in references including WO 2006/075203, WO 2004/050223 and C. E. Powell and G. G. Qiao, Journal of Membrane Science, 279 (2006), 1-49. Polyimides are known per se and have structural units of the formula —CO—NR—CO—. These structural units may in particular be part of a ring, preferably of a five-membered ring.

Polyimides may preferably have a weight-average molecular weight in the range from 25 000 to 500 000 g/mol.

Preferred polyimides can be obtained by condensation of anhydrides with amines and/or isocyanates. In this case it is preferred to react a difunctional anhydride with a difunctional isocyanate in strongly polar, aprotic solvents such as NMP, DMF, DMAc or DMSO, for example, with elimination of $CO_2$. An alternative option is to react a difunctional anhydride with a difunctional amine; in this variant, the polyamide acid formed to start with must be imidized in a second stage. This imidization is conventionally carried out thermally at temperatures above 150 to 350° C. or chemically with the assistance of water-removing agents such as acetic anhydride and a base such as pyridine at room temperature.

Preferred monomer units for preparing the polyimides comprise, inter alia, aromatic diisocyanates, more particularly 2,4-diisocyanatotoluene (2,4-TDI), 2,6-diisocyanatotoluene (2,6-TDI), 1,1'-methylenebis[4-isocyanatobenzene] (MDI), 1H-indene-2,3-dihydro-5-isocyanato-3-(4-isocyanatophenyl)-1,1,3-trimethyl (CAS 42499-87-6); aromatic acid anhydrides, examples being 5,5'-carbonylbis-1,3-isobenzofurandione (benzophenonetetracarboxylic dianhydride, BTDA) and pyromellitic anhydride (PMDA). These monomer units can be used individually or as a mixture.

According to one particular aspect of the present invention it is possible as polyimide to use a polymer which can be obtained from the reaction of a mixture comprising 5,5'-carbonylbis-1,3-isobenzofurandione (BTDA) with 2,4-diisocyanatotoluene (2,4-TDI), 2,6-diisocyanatotoluene (2,6-TDI) and 1,1'-methylenebis[4-isocyanatobenzene] (MDI). The fraction of BTDA in this case is preferably at least 70 mol %, more preferably at least 90 mol % and very preferably about 100 mol %, based on the acid anhydrides used. In this case the fraction of 2,4-TDI is preferably at least 40 mol %, more preferably at least 60 mol % and very preferably about 64 mol %, based on the diisocyanates employed. The fraction of 2,6-TDI in accordance with this embodiment is preferably at least 5 mol %, more preferably at least 10 mol % and very preferably about 16 mol %, based on the diisocyanates employed. The fraction of MDI in accordance with this embodiment is preferably at least 10 mol %, more preferably at least 15 mol % and very preferably about 20 mol %, based on the diisocyanates employed.

Preferably it is possible, furthermore, to use as polyimide a polymer which can be obtained from the reaction of a mixture comprising 5,5'-carbonylbis-1,3-isobenzofurandione (BDTA) and pyromellitic anhydride (PMDA) with 2,4-diisocyanatotoluene (2,4-TDI) and 2,6-diisocyanatotoluene (2,6-TDI). In this case the fraction of BDTA is preferably at least 40 mol %, more preferably at least 50 mol % and very preferably about 60 mol %, based on the acid anhydrides employed. In this embodiment the fraction of pyromellitic anhydride (PMDA) is preferably at least 10 mol %, more preferably at least 20 mol % and very preferably about 40 mol %, based on the acid anhydrides employed. The fraction of 2,4-TDI in accordance with this embodiment is preferably at least 40 mol %, more preferably at least 60 mol % and very preferably about 64 mol %, based on the diisocyanates employed. The fraction of 2,6-TDI in accordance with this embodiment is preferably at least 5 mol %, more preferably at least 10 mol % and very preferably about 16 mol %, based on the diisocyanates employed.

Besides homopolymers it is also possible, furthermore, to use copolymers as polyimides, the said copolymers comprising not only the imide units but also further functional groups in the main chain. According to one particular aspect of the present invention the polyimides may be derived to an extent of at least 50%, preferably at least 70% and very preferably at least 90% by weight from monomer units which lead to polyimides.

Polyimides whose use is particularly preferred may be obtained commercially under the trade name P84 from Inspec Fibres GmbH, Lenzing, Austria, or from HP-Polymer GmbH, Lenzing, Austria, and under the name Matrimid from Huntsman Advanced Materials GmbH, Bergkamen, Germany.

The composition of the invention contains at least 30%, preferably at least 50% and very preferably at least 70% by weight of a solvent.

Solvents for the substances set out above are known per se. The preferred solvents include, among others, polar organic solvents, more particularly dipolar aprotic solvents, aromatic amines, phenols or fluorinated hydrocarbons. The preferred phenols include more particularly m-cresol, thymol, carvacrol and 2-tert-butylphenol.

With particular preference it is possible to use dipolar aprotic solvents. These solvents are described in references including Römpp Chemie Lexikon, 2nd Edition on CD-ROM. The preferred dipolar aprotic solvents include, among others, N-methyl-2-pyrrolidone, N,N-dimethylacetamide, dimethylformamide and dimethyl sulphoxide.

The composition of the invention may further comprise at least one crosslinking agent. The term "crosslinking agent" refers more particularly to compounds able to lead to crosslinking of the highly branched polymers. These compounds, correspondingly, have at least two, preferably at least three and very preferably at least four functional groups which are able to react with functional groups of the highly branched polymers.

The crosslinking agents preferably have epoxide groups, isocyanate groups and/or acid groups, it also being possible for corresponding derivatives of these groups to be present, such as acid halides or acid anhydrides, for example.

The preferred crosslinking agents include, among others, epoxy resins, obtained for example by reaction of bisphenol A with epichlorohydrin, which are obtainable, for example, under the trade name Epikote from Hexion Specialty Chemicals Wesseling GmbH, Wesseling, Germany. Further preferred are acid-modified or anhydride-modified polymers such as polyethylenes, polypropylenes or polyethylene-vinyl acetates, for example, which are sold by DuPont under the trade name Bynel, for example. Further preferred are blocked polyisocyanates. Further preferred are polymeric carbodiimides such as the products sold under the trade name Stabaxol by Rhein Chemie Rheinau GmbH, Mannheim, Germany, for example. Further preferred are also polyfunctional compounds of low molecular mass, such as difunctional anhydrides, such as benzophenonetetracarboxylic dianhydride, and/or other, polyfunctional acids and/or their derivatives, and also polyfunctional isocyanates and/or their blocked derivatives.

The weight fraction of crosslinking agent in the composition can be preferably in the range from 0.01% to 5% and with more particular preference in the range from 0.1% to 1%, these figures being based on the composition used to produce the membranes.

The weight ratio of highly branched polymer to crosslinking agent can be preferably in the range from 50 to 1 and more preferably in the range from 20 to 1.

The composition of the invention preferably represents a solution whose viscosity with particular preference is in a range from 1 to 50 Pas, more particularly 2 to 25 Pas, and more particularly from 5 to 20 Pas, measured in accordance with DIN 53019.

The composition of the invention can be used in particular for producing membranes which can be used to separate substances such as gases, for example. For this purpose the compositions may, for example, by means of known methods, be cast to a membrane or processed to a hollow fibre. Preferred casting methods are described in references including N. Okui and A. Kubono [Prog. Polym. Sci. 19 (1994) 389-438], J. D. Swalen [Annu. Rev. Mater. Sci. 21 (1991) 373-408] and also in J. Xu [J. Appl. Polym. Phys. 73 (1999) 521-26].

The membranes of the invention comprise at least one filter layer obtainable using the composition of the invention. They preferably operate in accordance with the solution-diffusion mechanism. Preferred membranes of the present invention have at least one support layer and at least one adhesion promoter layer. They may additionally have a protective layer applied to the filter layer. Corresponding membrane constructions are shown in Baker, Ind. Eng. Chem. Res. 2002, 41, 1393-1411. Reference is made, furthermore, to the book "Membrane Technology in the Chemical Industry", S. Pereira Nunes and K.-V. Peinemann (eds.), April 2001, Wiley-VCH, Weinheim.

Accordingly the present invention also provides membranes having at least one filter layer, the filter layer comprising at least one component A) derived from linear polymers and at least one component B) derived from highly branched polymers, the weight ratio of component A) to component B) being in the range from 0.05:1 to 1.0:0.05. According to preferred embodiments the weight ratio of component A) to component B) can be in the range from 20:1 to 1:1, with particular preference in the range from 10:1 to 1.5:1 and with very particular preference in the range from 5:1 to 2:1.

Component A) is derived from the linear polymers set out above, and component B) from the highly branched polymers set out above. The term "component" makes it clear that the linear polymers are in the form of a physical mixture with the highly branched polymers, also called a blend, or else may be linked to the highly branched polymers via ionic or covalent bonds, for example.

According to one particular aspect of the present invention the filter layer of the membrane may have at least 5%, preferably at least 15% and very preferably at least 20% by weight of component A) derived from linear polymers.

The filter layer of the membrane may comprise preferably 1%, more preferably at least 5% and very preferably at least 10% by weight of component B derived from highly branched polymers.

The weight fractions of the respective components of the filter layer and also the weight ratio of the components A) and B) are a product of the weights of the composition used to produce the filter layer.

The filter layer of the present membranes preferably has a thickness of less than 25 µm, more preferably less than 10 µm, with particular preference less than 1 µm and with very particular preference less than 250 nm, which can be measured by means of transmission electron microscopy. The lower limit to the membrane thickness is a product of the mechanical requirements and the requirements imposed on the imperviousness of the membrane.

The water uptake (i.e. water swelling) can be determined in accordance with ISO 62 (water uptake in full contact). The test specimens used in that case are plaques produced from the starting material by means, for example, of a compression moulding operation in a heated press. In the present case it is possible, for example, to prepare an appropriate test specimen by casting methods as well, in which case it is possible, among other things, to use a composition according to the present invention.

The water uptake is determined gravimetrically. The water uptake is preferably in the range from 0.1% to 8%, more preferably 0.5% to 5%, with particular preference between 0.7% and 2% (percent by weight).

To determine the uptake of non-aqueous media the procedure of ISO 62 is adopted, with testing carried out in full contact at 23° C. The media in question, methanol for example, lead preferably to a weight increase which is within a range from 0.1% to 8%, preferably 0.5% to 5%, with particular preference between 0.7% and 2% (percent by weight).

The filter layers exhibit high temperature stability. According to one particular aspect the temperature stability is at least 100° C., preferably at least 150° C., more particularly at least 200° C. The temperature stability of the filter layers is determined using a test apparatus corresponding to ASTM D 1434. The test cell is heated to the stability temperature to be determined, 100° C. for example, more particularly 150° C. or preferably 200° C., and after certain times the permeability and selectivity of the membrane for nitrogen and oxygen are measured in accordance with ASTM D 1434. After 1000 h there is preferably a reduction in permeability by less than 10%, more preferably by less than 5% and very preferably by less than 2%. The reduction in selectivity after a measurement period of 1000 h at a temperature of 150° C. is less than 10%, preferably less than 5% and very preferably less than 2%.

The filter layers of the present membranes exhibit outstanding mechanical properties. Thus it is possible for preferred filter layers to have an elasticity modulus of at least 500 MPa, more preferably at least 750 MPa, more particularly at least 1000 MPa, the elasticity modulus being measured in accordance with ASTM D882.

The membranes of the present invention can be used to separate gas mixtures. These mixtures may contain, more particularly, oxygen, nitrogen, carbon dioxide, hydrogen, hydrocarbon gases, especially methane, ethane, propane, butane, and ammonia, it being possible for these mixtures to comprise two, three or more of the aforementioned gases.

According to one preferred aspect a membrane of the invention can be used more particularly for separating gas mixtures which contain oxygen. In this case the membranes preferably exhibit a high oxygen permeability. The oxygen permeability is preferably at least 0.05 barrer, more preferably at least 0.1 barrer, with particular preference at least 0.15 barrer, measured at 35° C. in accordance with ASTM D 1434. In accordance with especially preferred embodiments it is also possible to obtain membranes which have an oxygen permeability of preferably at least 0.5 barrer, with particular preference at least 1.0 barrer and very preferably at least 2.0 barrer, measured at 35° C. in accordance with ASTM D 1434.

According to one preferred aspect it is possible to use a membrane of the invention more particularly for separating gas mixtures which contain nitrogen. The membranes in this case preferably exhibit a high nitrogen permeability. The nitrogen permeability is preferably at least 0.001 barrer, more preferably at least 0.01 barrer, with particular preference at least 0.015 barrer, measured at 35° C. in accordance with ASTM D 1434.

According to a further particular aspect it is also possible for the membranes to have a low nitrogen permeability, in order in this way, for example, to obtain a high selectivity. According to this embodiment of the invention the nitrogen permeability may be preferably not more than 0.1 barrer, with particular preference not more than 0.05 barrer, measured at 35° C. in accordance with ASTM D 1434.

The permeability may be adjusted by way for example of the nature and amount of the highly branched polymer and also the nature and amount of the linear polymer, it being possible in many cases for a high fraction of highly branched polymers to lead to a relatively high permeability. A high fraction of linear polymers often leads to a high selectivity, but this is not intended to constitute a restriction.

The membranes of the invention exhibit an outstanding separation capacity, this separation capacity being a product more particularly of a difference in permeability of the gases in respect of the membrane. The selectivity of preferred membranes, defined as the ratio of nitrogen permeability to oxygen permeability, is preferably at least 2, more preferably at least 5, with particular preference at least 7 and very preferably at least 15.

The membranes of the present invention can be used in any known form. As well as flat membranes, therefore, these membranes may also take the form of hollow fibre membranes.

Surprisingly the production of the membrane is accomplished with relatively small amounts of solvent, so that the solids content is relatively high. This advantage is achieved through factors including the use of highly branched polymers. By this means it is possible to achieve further advantages. Thus, for example, explosion prevention measures are made easier. For the realization of the membrane production process, therefore, there are fewer technical measures needed in order to obtain the same degree of safety. Furthermore, the use of less solvent entails an advantage in respect of environmental protection and also in respect of the protection of the operatives involved in the membrane production process. Furthermore, it is possible to do without a swelling step, which would likewise need to be carried out using solvent.

The present invention is illustrated below by means of examples, without any intention that this should constitute a restriction.

EXAMPLES

Preparation Example A

Preparation of PEI-g-PA6

A 10 l stirred autoclave was charged with the following reactants:
4.454 kg caprolactam
0.264 kg demineralized water
0.006 kg hypophosphorous acid (50% w/w in water)

The contents of the vessel were rendered inert, taken to 245° C., left for 6 hours with stirring at the autogenous pressure, and let down to 10 bar over a period of 90 minutes. 0.570 kg of Lupasol® G100, a 50% strength aqueous solution of a polyethylenimine with a molar mass of 5100, obtainable from BASF AG, was then injected into the reactor contents through a lock, and stirred into the melt for 30 minutes under the autogenous pressure of 16 bar. Subsequently the reactor was let down over the course of 3 hours and its contents stirred for a further 2 hours under a nitrogen stream of 25 l/h. The contents of the vessel were extruded by means of a melt pump and pelletized. The analytical characteristics of the polymer were as follows:

| | |
|---|---|
| Relative solution viscosity (0.5% strength in m-cresol, 25° C.): | 1.20 |
| Carboxyl end groups (alkalimetrically against KOH in benzyl alcohol) | 10 mmol/kg |
| Amino end groups (acidimetrically against perchloric acid in m-cresol) | 1116 mmol/kg |
| Melting temperature: | 208° C. |

Preparation Example B

Preparation of PEI-g-PA6

In accordance with preparation example A, a 10 l stirred autoclave was charged with the following reactants:
4.535 kg caprolactam
0.014 kg dodecanedioic acid
0.264 kg demineralized water
0.006 kg hypophosphorous acid (50% w/w in water)
and also with 0.387 kg of Lupasol® G 100 as a later addition via the lock. The characteristics of the pellets obtained were as follows:

| | |
|---|---|
| Relative solution viscosity (0.5% strength in m-cresol, 25° C.): | 1.30 |
| Carboxyl end groups (alkalimetrically against KOH in benzyl alcohol) | 7 mmol/kg |
| Amino end groups (acidimetrically against perchloric acid in m-cresol) | 581 mmol/kg |
| Melting temperature: | 214° C. |

Preparation Example C

Preparation of PEI-g-PA6

In accordance with preparation example A, a 10 l stirred autoclave was charged with the following reactants:
4.441 kg caprolactam
0.014 kg dodecanedioic acid
0.264 kg demineralized water
0.006 kg hypophosphorous acid (50% w/w in water)
and also with 0.569 kg of Lupasol® G 100 as a later addition via the lock. The characteristics of the pellets obtained were as follows:

| | |
|---|---|
| Relative solution viscosity (0.5% strength in m-cresol, 25° C.): | 1.22 |
| Carboxyl end groups (alkalimetrically against KOH in benzyl alcohol) | 12 mmol/kg |
| Amino end groups (acidimetrically against perchloric acid in m-cresol) | 775 mmol/kg |
| Melting temperature: | 211° C. |

Comparative Example 1

A 10% strength solution consisting of (a) 90 g of carvacrol and (b) 10 g of P84 (polyimide obtainable from Inspec Fibres GmbH) was prepared by mixing of components (a) and (b). Using a film applicator (from Elcometer), this solution was applied to a glass plate, the wet film thickness being 250 μm. The membrane was dried under a nitrogen atmosphere (24 h at room temperature and then 48 h at 150° C.)

The membrane produced was subjected to measurement on an apparatus according to ASTM D 1434 at 35° C. using the gases oxygen and nitrogen.

The membrane had an oxygen permeability of 0.19 barrer ($O_2$) and a nitrogen permeability of 0.013 barrer. This gives a selectivity of 14.6.

Inventive Example 1

A 10% strength solution consisting of
(a) 90 g of carvacrol and
(b) 9 g of P84 (polyimide obtainable from Inspec Fibres GmbH) and
(c) 1 g of the hyperbranched polymer from preparation example A
was prepared by mixing of the three components (a) to (c). Using a film applicator (from Elcometer), this solution was applied to a glass plate, the wet film thickness being 250 μm. The membrane was dried under a nitrogen atmosphere (24 h at room temperature and then 48 h at 150° C.)

The membrane produced was subjected to measurement on an apparatus according to ASTM D 1434 at 35° C. using the gases oxygen and nitrogen.

The membrane had an oxygen permeability of 0.101 barrer ($O_2$) and a nitrogen permeability of 0.002 barrer. This gives a selectivity of 48.

In addition the temperature stability of this membrane was investigated. After a measurement period of 1000 h at 150° C. there was no apparent reduction in either the permeability or the selectivity as measured in accordance with ASTM D 1434.

Inventive Example 2

A 10% strength solution consisting of (a) 90 g of carvacrol and (b) 9 g of P84 (polyimide obtainable from Inspec Fibres GmbH) and (c) 1 g of the hyperbranched polymer from preparation example B was prepared by mixing of the three components (a) to (c). Using a film applicator (from Elcometer), this solution was applied to a glass plate, the wet film thickness being 250 μm. The membrane was dried under a nitrogen atmosphere (24 h at room temperature and then 48 h at 150° C.)

The membrane produced was subjected to measurement on an apparatus according to ASTM D 1434 at 35° C. using the gases oxygen and nitrogen.

The membrane had an oxygen permeability of 0.297 barrer ($O_2$) and a nitrogen permeability of 0.008 barrer. This gives a selectivity of 37.1.

Inventive Example 3

A 10% strength solution consisting of (a) 90 g of carvacrol and (b) 9 g of P84 (polyimide obtainable from Inspec Fibres GmbH) and (c) 1 g of the hyperbranched polymer from preparation example C was prepared by mixing of the three components (a) to (c). Using a film applicator (from Elcometer), this solution was applied to a glass plate, the wet film thickness being 250 μm. The membrane was dried under a nitrogen atmosphere (24 h at room temperature and then 48 h at 150° C.)

The membrane produced was subjected to measurement on an apparatus according to ASTM D 1434 at 35° C. using the gases oxygen and nitrogen.

The membrane had an oxygen permeability of 0.343 barrer ($O_2$) and a nitrogen permeability of 0.014 barrer. This gives a selectivity of 24.5.

Comparative Example 2

From pure hyperbranched PEI-g-PA6 (solution consisting of (a) 90 g of carvacrol and (b) 10 g of hyperbranched polymer from preparation example A) it was not possible to manufacture mechanically stable membranes.

Comparative Example 3

Furthermore it was found that membranes obtained accordingly from a 10% strength solution consisting of (a) 90 g of carvacrol, (b) 9 g of P84 (polyimide available from Inspec Fibres GmbH) and (c) 1 g of Ultramid B27E (a PA6 from BASF AG) had permeabilities of only <0.005 barrer for oxygen and nitrogen.

The invention claimed is:

1. A solution composition for producing a membrane wherein the composition comprises a mixture of 0.1% to 69.5% by weight of a highly branched polymer, 0.5% to 69.9% by weight of a linear polymer and 30% to 99.4% by weight of a solvent, wherein the percentages are based on the sum of the highly branched polymer, the linear polymer, and the solvent,
wherein the linear polymer is at least one polymer selected from the group consisting of a polyimide, polyetherimide, polysulphone, polyarylate, polyetherarylate, polycarbonate, polypyrrolone, polyacetylene, polyethylene oxide, polyphenylene oxide, polyphenylene sulphide, polybenzimidazole, polyoxadiazole, polyetheretherketone and polyaniline, and
wherein the highly branched polymer is at least one polymer selected from the group consisting of a polyamide, polyesteramide, polyamidoamine, polyimidoamine, polypropylenamine, polyimide, polyetherimide, polysilane, polysiloxane, polysulfone, polyurethane and polyurea.

2. The composition according to claim 1, wherein the highly branched polymer has a molecular weight in the range from 1500 to 100 000 g/mol.

3. The composition according to claim 1, wherein the highly branched polymer has a degree of branching of 1% to 95%.

4. The composition according to claim 3, wherein the highly branched polymer has a degree of branching of 10% to 95%.

5. The composition according to claim 1, wherein the highly branched polymer has at least one terminal amino group.

6. The composition according to claim 1, wherein the highly branched polymer is a graft copolymer comprising the following monomers:
   a) from 0.5% to 25% by weight, based on the graft copolymer, of a polyamine having at least 11 nitrogen atoms and a number-average molecular weight $M_n$ of at least 500 g/mol and
   b) at least one polyamide-forming monomer.

7. The composition according to claim 1, wherein the linear polymer has a molecular weight in the range from 1000 to 1 000 000 g/mol.

8. The composition according to claim 1, wherein the solvent is a polar organic solvent.

9. The composition according to claim 1, wherein the composition comprises a crosslinking agent.

10. A separation membrane wherein the membrane comprises at least one filter layer obtained by using the composition according to claim 1.

11. The membrane according to claim 10, wherein the at least one filter layer comprises at least one component A) derived from a linear polymer and at least one component B) derived from a highly branched polymer, wherein the weight ratio of the at least one component A) to the at least one component B) is in the range from 0.05:1 to 1:0.05.

12. The membrane according to claim 11, wherein the weight ratio of the at least one component A) to the at least one component B) is in the range from 5:1 to 2:1.

13. The membrane according to claim 11, wherein the at least one component A) and the at least one component B) are linked to one another.

14. The membrane according to claim 11, wherein the at least one component A) comprises at least one polymer selected from the group consisting of a polyimide, polyetherimide, polysulphone, polyarylate, polyetherarylate, polycarbonate, polypyrrolone, polyacetylene, polyethylene oxide, polyphenylene oxide, polyphenylene sulphide, polybenzimidazole, polyoxadiazole, polyetheretherketone and a polyaniline.

15. The membrane according to claim 11, wherein the at least one component B) comprises at least one highly branched polymer selected from the group consisting of a polyamide, polyesteramide, polyamidoamine, polyimidoamine, polypropylenamine, polyimide, polyetherimide, polysilane, polysiloxane, polysulphone, polyurethane and polyurea.

16. The membrane according to claim 11, wherein the molar mass of the highly branched polymer of the at least one component B) is at least 3000 g/mol.

17. The membrane according to claim 10, wherein the membrane has an oxygen permeability of at least 0.05 barrer.

18. The membrane according to claim 10, wherein the membrane has a nitrogen permeability of at least 0.001 barrer.

19. The membrane according to claim 10, wherein the membrane has an oxygen/nitrogen selectivity of at least 2.

20. The membrane according to claim 10, wherein the at least one filter layer has a thickness of less than 25 mm.

21. The membrane according to claim 10, wherein the at least one filter layer has a temperature stability of at least 100° C.

22. The membrane according to claim 10, wherein the at least one filter layer has an elasticity modulus of at least 500 MPa.

23. The membrane according to claim 10, wherein the membrane further comprises at least one support layer and at least one adhesion promoter layer.

24. A method of producing a membrane, comprising casting the composition according to claim 1 to the membrane.

25. The method of producing a membrane according to claim 24, wherein said composition is processed to a hollow fibre.

* * * * *